United States Patent

Thwaites et al.

[11] Patent Number: 5,951,742
[45] Date of Patent: Sep. 14, 1999

[54] PROCESSES FOR THE SCRUBBING OF EXHAUST GAS STREAMS

[75] Inventors: Michael J. Thwaites, Basingstoke; Stephen W. Kew, West Sussex, both of United Kingdom

[73] Assignee: The BOC Group plc, Surrey, United Kingdom

[21] Appl. No.: 08/899,240

[22] Filed: Jul. 23, 1997

[30] Foreign Application Priority Data

Jul. 29, 1996 [GB] United Kingdom .................. 96 15859

[51] Int. Cl.[6] ....................................... B03C 3/06
[52] U.S. Cl. .............................. 95/57; 55/DIG. 38; 95/78; 96/70; 96/97; 96/100; 204/157.3; 422/22
[58] Field of Search .................... 95/78, 57; 96/69, 96/70, 98, 97, 84, 100; 55/DIG. 38; 204/157.3; 422/22, 121

[56] References Cited

U.S. PATENT DOCUMENTS

| 1,357,202 | 10/1920 | Nesbit ................................ 55/DIG. 38 |
| 3,431,411 | 3/1969 | Harrick .................................... 96/98 X |
| 3,679,973 | 7/1972 | Smith, Jr. et al. .................. 55/DIG. 38 |
| 4,072,477 | 2/1978 | Hanson et al. ..................... 55/DIG. 38 |
| 4,077,785 | 3/1978 | Hartshorn .......................... 55/DIG. 38 |
| 4,710,203 | 12/1987 | Batza et al. ............................ 96/98 X |
| 5,348,571 | 9/1994 | Weber ................................ 55/DIG. 38 |
| 5,395,430 | 3/1995 | Lundgren et al. ..................... 96/98 X |
| 5,538,692 | 7/1996 | Joannou ................................. 96/97 X |
| 5,614,002 | 3/1997 | Chen ....................................... 96/69 X |

FOREIGN PATENT DOCUMENTS

| 563130 | 9/1958 | Canada ............................. 55/DIG. 38 |
| 662537 | 12/1951 | United Kingdom ............. 55/DIG. 38 |

Primary Examiner—Richard L. Chiesa
Attorney, Agent, or Firm—David M. Rosenblum; Salvatore P. Pace

[57] ABSTRACT

A process for the scrubbing of undesirable substances from an exhaust gas stream which comprises passing the stream through a hollow cathode.

8 Claims, 3 Drawing Sheets

PROCESSES FOR THE SCRUBBING OF EXHAUST GAS STREAMS

BACKGROUND OF THE INVENTION

This invention relates to the scrubbing of exhaust gas stream and, more particularly, to the scrubbing of highly reactive gases from exhaust streams emanating from semiconductor device processing.

The semiconductor industry relies on the use of a wide range of thermal, chemical and plasma driven processes to produce semiconductor devices on silicon and other substrates. Such processes generally involve both the deposition of material on to and the removal of material from the substrates and structures on the surface.

Much of the equipment used for these processes requires vacuum pumps to control the environment within a process chamber during operation of the processes. Many of the chemicals used in these fabrication processes are extremely corrosive and chemically reactive and form undesirable by-products which can be harmful to the environment if released and can lead to a breakdown of the vacuum pumps and other equipment used for controlling the operation of the processes.

For example, many semiconductor processes involve the use of highly reactive gases such as silane ($SiH_4$), ammonia ($NH_3$), phosphine ($PH_3$), diborane ($B_2H_6$) and tetraethylorthosilicate (TEOS). Such gases have to be pumped from the process chamber at the relevant part of the semiconductor processing to the atmosphere and if they decompose in the vacuum pump could lead to pump failure. In any event, the gases themselves or their reaction products should not be released into the atmosphere.

Numerous previous processes and apparatus have been proposed for scrubbing such exhaust gas streams from semiconductor processing. These prior processes include a variety of wet chemical processes in which one or more noxious species in an exhaust stream can be rendered harmless; they also include different dry processes including those described in Patent Specification No WO 89/11905 in which such noxious species can be reacted in, for example, a two stage heated dry scrubber comprising a silicon granule first stage and a calcium oxide second stage, both stages being conveniently held in a stainless steel tube.

In addition, certain types of combustion chamber processes have been proposed, particularly ones involving the combustion of the exhaust stream gases mixed with fuel gas and oxygen in a combustion system, for example one having a foraminous burner.

Although some of these prior processes/apparatus have met with commercial success, there remains a need for alternative systems to deal with certain types of exhaust stream components and, in particular, one which could be operated at low pressures to enable them to scrub the exhaust stream components prior to the stream entering the vacuum exhaust system or, alternatively, between the stages of a multistage vacuum pump or between two separate vacuum pumps.

SUMMARY OF THE INVENTION

The present invention is concerned with the provision of processes and apparatus which generally can meet these needs.

In accordance with the invention, there is provided a process for the scrubbing of undesirable substances from an exhaust gas stream which comprises passing the stream through a hollow cathode.

The hollow cathode effect can be achieved by application to the cathode of either alternating (AC) or direct current (DC) between it and an anode and using, in the former case, one of a wide range of excitation frequencies, for example from 50 HZ (mains) frequency up to radio frequencies. The AC supply may be applied directly or it may be a rectified AC supply via, for example, a full wave bridge from a high reactance transformer.

For example in a conventional DC plasma system in vacuum, there are several structure plasma bands between a cathode and an anode. Nearest the cathode is the "Crook's dark space" and the "negative glow". A hollow cathode of the type required in the present invention is formed when two such cathodes are arranged close together such that the negative glows from the two cathodes overlap.

In such a hollow cathode, electrons produced by secondary electron emission as a result of plasma ions—for example argon ions—colliding with either cathode will be accelerated away from that cathode and through the negative glow and subsequently towards the other cathode. However, as the electron approaches the other cathode it will experience a repulsive force which urges it back through the negative glow and towards the original cathode.

As a result, electrons are caused to travel along an oscillatory trajectory leading to a high degree of plasma gas ionisation/excitation as a result of the increased path length trajectory of the electrons.

Instead of employing two parallel plate cathodes to produce the hollow cathode effect, it is preferred to employ a hollow cylindrical tube. As such, the tube itself will be negatively charged to form the cathode and will be sized, with particular reference to its internal radius and length, such that, at the process operating parameters, part of the inside of the tube will exhibit Crooks dark space/negative glow characteristics, i.e. hollow cathode characteristics.

To overcome restrictions on the exhaust gas stream throughput in the process of the invention caused in particular by the need to restrict the radius of the hollow cathode in a manner described above, apparatus for carrying out the process advantageously comprises a plurality of hollow cathodes arranged in an array such that the stream is passed through the cathodes in parallel.

In such advantageous embodiments, the cathodes may be bundled together in parallel. However, most advantageously cathode tubes are formed as a plurality of bores in a solid electrically conductive body, for example of stainless steel or copper or other metal or alloy.

To enable completeness of reaction of the exhaust gas stream components in the process of the invention, it is possible and sometimes preferred to employ more than one array of hollow cathodes such that the exhaust gas stream passes through each array in series.

BRIEF DESCRIPTION OF THE DRAWINGS

For a better understanding of the invention, reference will now be made, by way of exemplification only, to the accompanying drawings in which.

DETAILED DESCRIPTION

Figure 1:
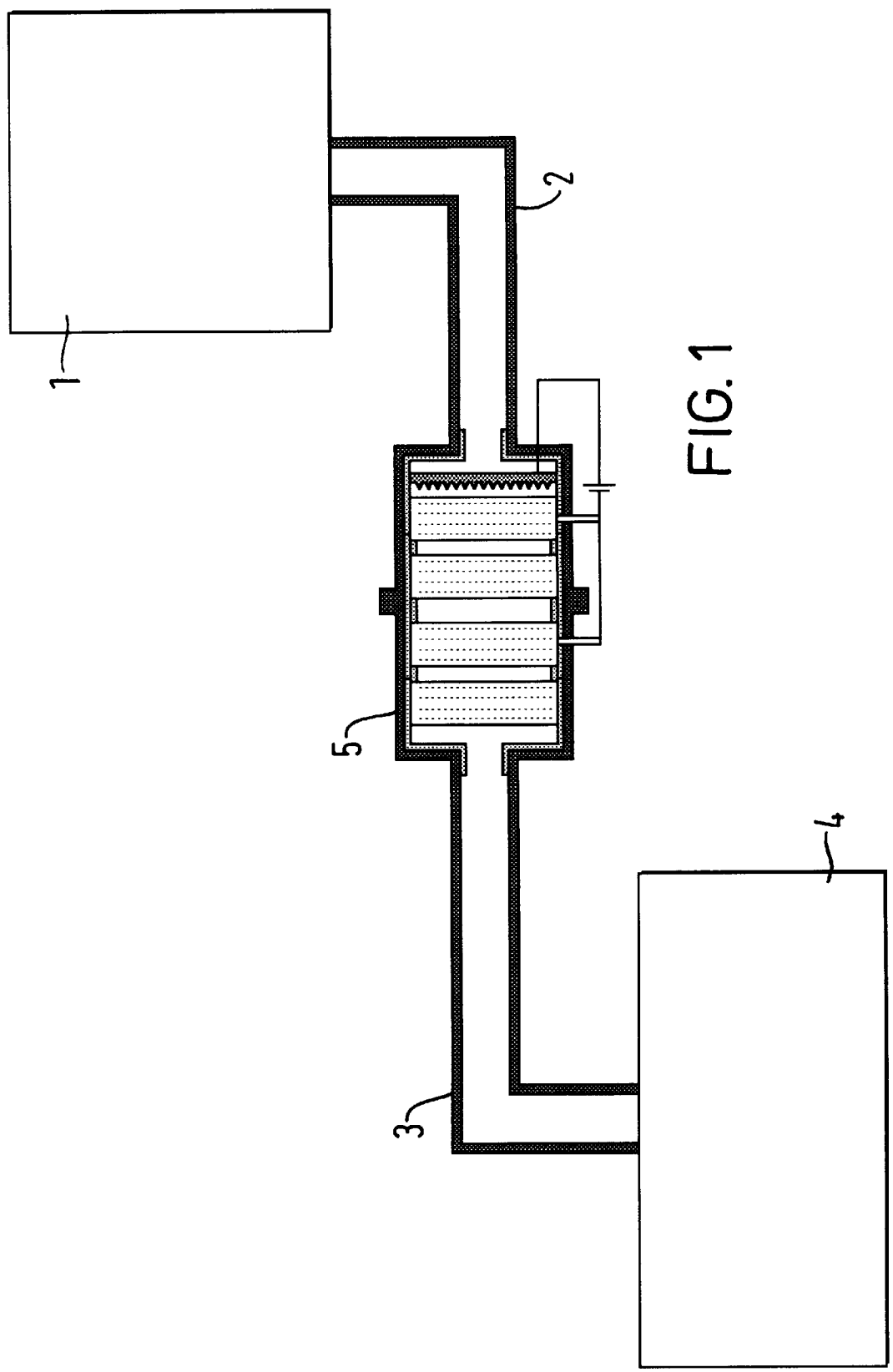
FIG. 1 shows a schematic representation of a semiconductor processing system comprising a process chamber, a sectional view of a scrubbing apparatus employing a process of the invention and vacuum exhaust system.

With reference to the drawings, there is shown in FIG. 1 apparatus for carrying out a process of the invention. it shows in process chamber 1 in which a semiconductor processing can take place and exhaust ducts 2, 3 leading to a vacuum pump system 4 which can comprise one or more vacuum pumps, typically a turbomolecular pump backed with a separate mechanical dry pump acting in tandem.

Positioned between the exhaust ducts 2, 3 is a scrubbing apparatus 5 for carrying out a process of the invention.

Figure 2:
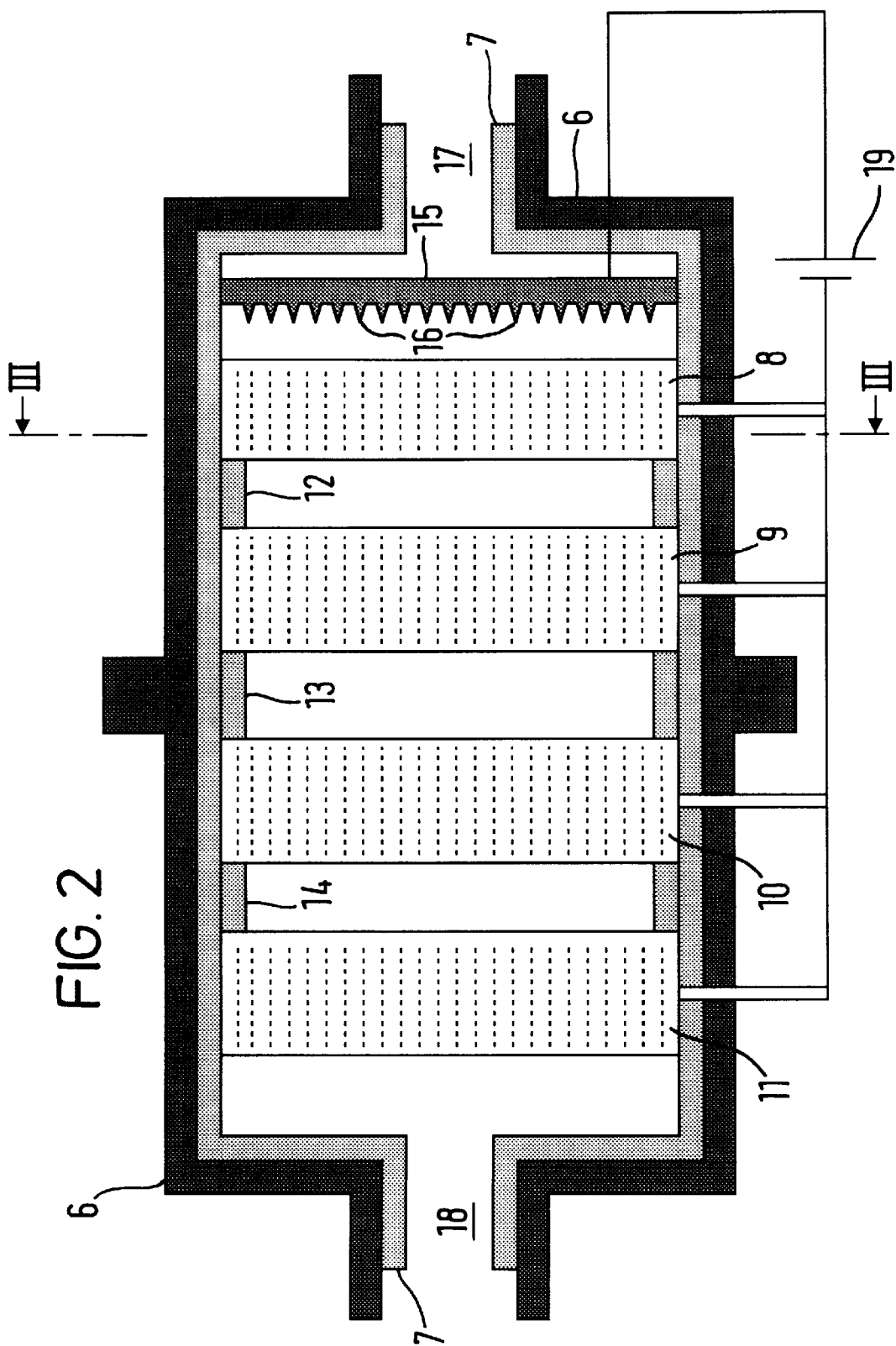
FIG. 2 shows the same sectional view of the scrubbing apparatus shown in FIG. 1 in more detail.

The scrubbing apparatus 5 is shown in more detail in FIG. 2. It comprises a substantially cylindrical body having a multipiece outer shell 6 within which is an electrically non-conductive multipiece inner shell 7. The inner shell 7 supports four cylindrical stainless steel blocks 8, 9, 10, 11.

Figure 3:
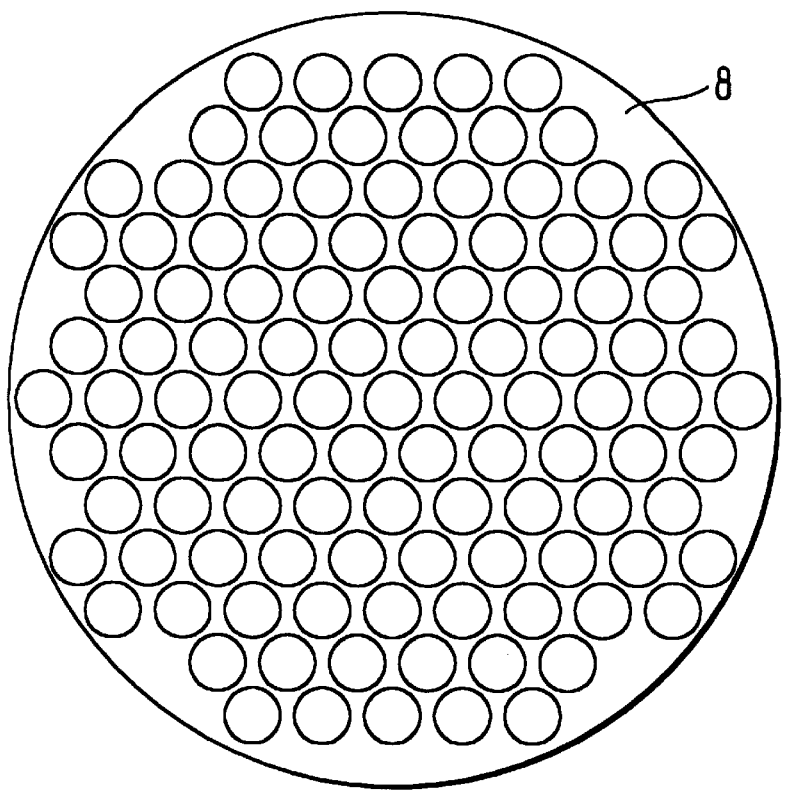
FIG. 3 shows a further sectional view of the scrubbing apparatus of FIG. 1 and 2 along the lines III—III of FIG. 2 in particular.

Each of the four stainless steel blocks 8, 9, 10, 11 has formed therein a plurality—one hundred and nine—of bores of axial orientation as shown more clearly in the further sectional view of FIG. 3.

Each block 8, 9, 10, 11 has a diameter of 100 mm and a length of 50 mm with each bore—open at both ends— having a diameter of 10 mm.

Annular insulating elements 12, 13, 14 provide further insulation between the blocks 8, 9, 10, 11.

The insulating inner shell 7 also supports a substantially ring shaped anode 15 having an outer diameter approximately the same as the internal diameter of the shell 7 and a thickness of about 5 mm. A multiplicity of anode points 16 extend from the anode 15 in the direction of the outer periphery of the near flat face of the block 8. Such anode points can assist in maintaining the plasma—and a hollow cathode effect—in each of the bores. The shells 6, 7 have found therein a gas inlet 17 and a gas outlet 18.

A power source 19 is provided to charge each of the blocks 8, 9, 10, 11 to a cathode (negative) potential and the anode 15 to an anode (positive) potential.

In a process of the invention conducted utilising the apparatus shown in the drawings, argon gas was introduced into the duct 2 between the process chamber 1 and the scrubbing apparatus 5 at a rate of 30 to 40 standard cm$^3$/min and, by virtue of the operation of the vacuum pump system 4, is urged through the scrubbing apparatus 5. It should be noted that this flow rate can be of the order of several, for example 2 to 3, litres/minute.

A variable voltage was provided from the power source 19 in the form of a rectified AC supply via a full wave bridge from a high reactance transformer such that arcs are not sustained.

At an operating pressure in the scrubbing apparatus 5 of 2 mbar, the power to the blocks 8, 9, 10, 11 was slowly increased and the voltage/current characteristics measured. At about 100 v to the blocks 8, 9, 10, 11 (the anode 16 being at earth potential) a plasma was observed in the individual bores. Further increases in the supplied power led to voltage saturation but with the current substantially continuously increasing; this was the onset of the hollow cathode effect.

Figure 4:
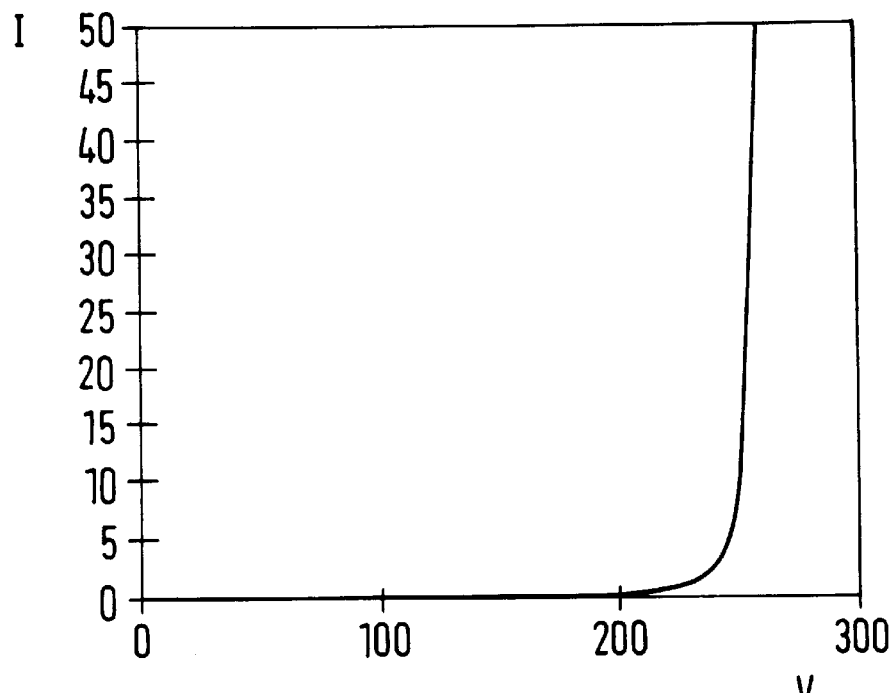
FIG. 4 shows I/V characteristics for the apparatus shown in FIG. 2.

The current/voltage (I/V) characteristics are shown in FIG. 4 indicating a saturation voltage of about 250 v at relatively high current for the particular gas used, in this case argon.

To illustrate the scrubbing of undesirable exhaust gas components, methane gas was caused to flow from the process chamber and mix with the argon supply introducing an argon/methane gas mixture in to the individual bores of the blocks 8, 9, 10, 11 moved the onset of the saturation voltage to over 400 v and resulted in the decomposition of the methane component of the gas mixture in to a graphitic powder within the hollow cathode bores.

In long term use of the scrubbing system, contamination due to the decomposition of methane and the formation of graphitic powder in the bores build up. This may necessitate the orientation of the blocks 8, 9, 10, 11 such that the bores therein are vertical, thereby allowing such particles to be expelled from the bores and directed in to some form of collector for ready removal for the apparatus and subsequent collection.

The use of methane in the above illustration of the invention demonstrates the effective scrubbing of strongly bonded molecules, the C—H bond in methane being particularly strong.

In addition to the apparatus described above with reference to the drawings, the process of the invention may be carried out in a simpler form of apparatus, for example one having a single cathode block of conducting material which, together with a suitable anode, is held within an insulating body and adapted to receive a DC supply or alternatively an AC or rectified AC supply to maintain a potential across the system and to form the hollow cathode effect in the bores of the cathode block. The cathode can be similar to that shown and described with reference to FIG. 2 in particular.

It is thought that the process of the invention can be used to good effect with most if not all gases employed in semiconductor processing, in particular gaseous compounds of the elements boron, aluminium, silicon, phosphorus, gallium and arsenic together with chlorine, chloro-, fluoro- and chloro-fluoro carbons; these gases include chlorine, silicon tetrachloride, copper chloride (CuCl), aluminium chlorides (eg AlCl$_3$), silicon tetrafluoride (SiF$_4$), trifluoromethane (CHF$_3$), carbonyl fluoride (COF$_2$), carbonyl chloride (COCl$_2$), boron trichloride (BCl$_3$), boron tribromide (BBr$_3$), hydrogen chloride (HCl), carbon tetrachloride (CCl$_4$), silane (SiH$_4$), dichlorosilane (SiCl$_2$H$_2$), tetraethylorthosilicate (Si(OC$_2$H$_5$)$_4$), diborane (B$_2$H$_6$), trimethyl borate (B(OCH$_3$)$_3$), phosphine (PH$_3$), ammonia (NH$_3$), trimethylphosphite (P(OCH$_3$)$_3$), arsine (AsH$_3$), trimethylphosphite (TMP), trimethylborate (TMB) and trimethylaluminium (TMA).

Apparatus for use in the process of the invention can be usefully employed as a stand alone piece of apparatus or for incorporation in to or specific components for use in conjunction with vacuum pumps, for example for use in the vicinity of the inlet to such a pump or for use between the stages of a multistage pump or, indeed, between two different vacuum, pumps. The fact that the apparatus is designed to operate, and must be operated, at low pressure means that it is particularly suitable for use at some point prior to the final exhaust of the gas stream from the vacuum pump system as a whole.

We claim:

1. A process for scrubbing undesirable substances from an exhaust gas stream comprising:

passing said exhaust gas stream through a hollow cathode located within a process chamber;

during passage of said exhaust gas stream, subjecting the process chamber to a subatmospheric pressure and said hollow cathode to an electrical potential so that hollow cathode characteristics are produced within part of said hollow cathode comprising that of Crooks dark space and negative glow, thereby to cause decomposition of said undesirable substances passing through said hollow cathode.

2. The process according to claim 1 in which the hollow cathode is a hollow cylindrical tube.

3. The process according to claim 1 or claim 2 further comprising a plurality of said hollow cathodes arranged in an array such that the stream is passed through the cathodes in parallel.

4. The process according to claim 3 in which one array of said hollow cathodes is employed.

5. The process according to claim 3 in which a plurality of said arrays are employed such that the exhaust gas stream passes through each said array in series.

6. The process according to claim 3 in which a plurality of bores in a solid electrically conductive body define said hollow cathode.

7. The process according to claim 6 in which the electrically conductive body is of stainless steel.

8. The process according to claim 6 in which the electrically conductive body is fabricated from copper.

\* \* \* \* \*